(12) United States Patent
Terada et al.

(10) Patent No.: US 11,966,662 B2
(45) Date of Patent: Apr. 23, 2024

(54) ACOUSTIC PROCESSING SYSTEM, ACOUSTIC PROCESSING METHOD, AND INFORMATION PROCESSING APPARATUS

(71) Applicant: YAMAHA CORPORATION, Hamamatsu (JP)

(72) Inventors: Kotaro Terada, Hamamatsu (JP); Shintaro Noguchi, Irvine, CA (US)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/859,262

(22) Filed: Jul. 7, 2022

(65) Prior Publication Data

US 2023/0023299 A1 Jan. 26, 2023

(30) Foreign Application Priority Data

Jul. 13, 2021 (JP) .................................. 2021-115712

(51) Int. Cl.
*G06F 15/16* (2006.01)
*G06F 3/16* (2006.01)

(52) U.S. Cl.
CPC .............. *G06F 3/165* (2013.01); *G06F 3/162* (2013.01)

(58) Field of Classification Search
CPC ................................ G06F 3/165; G06F 3/162
See application file for complete search history.

(56) References Cited

U.S. PATENT DOCUMENTS

| | | | | |
|---|---|---|---|---|
| 6,625,271 | B1* | 9/2003 | O'Malley | H04M 3/561 379/202.01 |
| 7,796,583 | B1* | 9/2010 | Enderby | H04L 12/2898 370/413 |
| 2011/0130200 | A1* | 6/2011 | Terada | H04H 60/04 463/31 |
| 2012/0078383 | A1* | 3/2012 | Takahashi | H04L 41/0859 700/7 |
| 2013/0131841 | A1* | 5/2013 | Furumoto | G08C 17/00 700/19 |
| 2015/0334333 | A1* | 11/2015 | Kuwahara | H04N 21/485 348/552 |
| 2016/0266768 | A1* | 9/2016 | Han | H04M 1/72415 |

FOREIGN PATENT DOCUMENTS

JP 2010072656 A 4/2010
JP 2021018590 A 2/2021

* cited by examiner

*Primary Examiner* — Duyen M Doan
(74) *Attorney, Agent, or Firm* — ROSSI, KIMMS & McDOWELL LLP

(57) ABSTRACT

An acoustic processing system for audio signal processing includes a first apparatus including a first memory that stores a first parameter for the audio signal processing and a user interface that receives an operation for changing the first parameter, a second apparatus including a second memory that stores a second parameter synchronized with the first parameter and a first CPU that performs system control, and a third apparatus including a second CPU that performs the audio signal processing. The first CPU sends, to the third apparatus, control information for controlling the audio signal processing based on the second parameter, and the second CPU receives the control information, and performs the audio signal processing based on the control information.

11 Claims, 14 Drawing Sheets

ACOUSTIC PROCESSING SYSTEM, ACOUSTIC PROCESSING METHOD, AND INFORMATION PROCESSING APPARATUS

CROSS REFERENCE TO RELATED APPLICATIONS

This Nonprovisional application claims priority under 35 U.S.C. § 119(a) on Patent Application No. 2021-115712 filed in Japan on Jul. 13, 2021, the entire contents of which are hereby incorporated by reference.

BACKGROUND

Technical Field

An embodiment of the present disclosure relates to an acoustic processing system, an acoustic processing method, and an information processing apparatus.

Background Information

Japanese Unexamined Patent Application Publication No. 2010-072656 discloses a personal computer in which a large amount of remote control software that is able to be plugged in music software is installed. The personal computer performs synchronous processing of operation parameters between each remote control software and a corresponding external device.

Japanese Unexamined Patent Application Publication No. 2021-018590 discloses a control apparatus including first and second control boards capable of two-way communication. The first and second control boards include a parameter storage that stores a parameter. The parameters of the first and second control boards are synchronized.

Both Japanese Unexamined Patent Application Publication No. 2010-072656 and Japanese Unexamined Patent Application Publication No. 2021-018590 simply disclose a configuration to simply synchronize a memory (a parameter) of a certain device and a certain device. Neither prior art has considered distributing audio signal processing.

SUMMARY

In view of the foregoing, an embodiment of the present disclosure is directed to provide an acoustic processing system capable of flexibly and easily distributing audio signal processing.

An acoustic processing system for audio signal processing includes a first apparatus including a first memory that stores a first parameter for the audio signal processing and a user interface that receives an operation for changing the first parameter, a second apparatus including a second memory that stores a second parameter synchronized with the first parameter and a first CPU that performs system control, and a third apparatus including a second CPU that performs audio signal processing. The first CPU sends, to the third apparatus, control information for controlling the audio signal processing based on the second parameter, and the second CPU receives the control information, and performs the audio signal processing based on the control information.

An embodiment of the present disclosure is able to flexibly and easily distribute audio signal processing.

DETAILED DESCRIPTION

Figure 1:
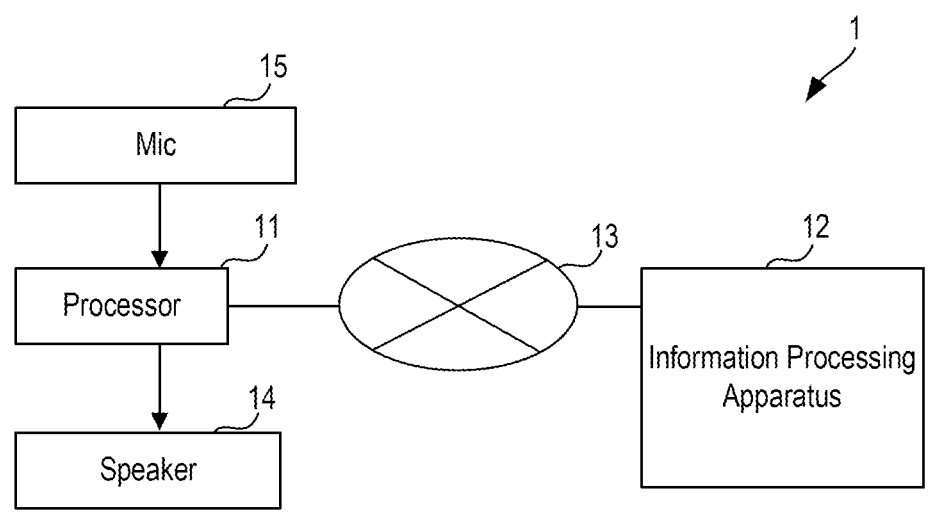
FIG. 1 is a block diagram showing a configuration of an acoustic processing system 1.

FIG. 1 is a block diagram showing a configuration of an acoustic processing system 1. The acoustic processing system 1 includes a processor 11, an information processing apparatus 12, a network 13, a speaker 14, and a microphone 15.

The processor 11 and the information processing apparatus 12 are connected through the network 13. The network 13 includes a LAN (a local area network) or the Internet. The processor 11 is connected to the speaker 14 and the microphone 15 through an audio cable.

However, in the present disclosure, the connection between the devices is not limited to such an example. For example, the processor 11, the speaker 14, and the microphone 15 may be connected through the network. In addition, the processor 11 and the information processing apparatus 12 may be connected by a communication line such as a USB cable.

The processor 11 is an example of an audio signal processing apparatus. The processor 11 receives an audio signal from the microphone 15. In addition, the processor 11 outputs the audio signal to the speaker 14. While the present embodiment shows the speaker 14 and the microphone 15 as an example of an acoustic device to be connected to the processor 11, a greater number of acoustic devices may be further connected.

Figure 2:
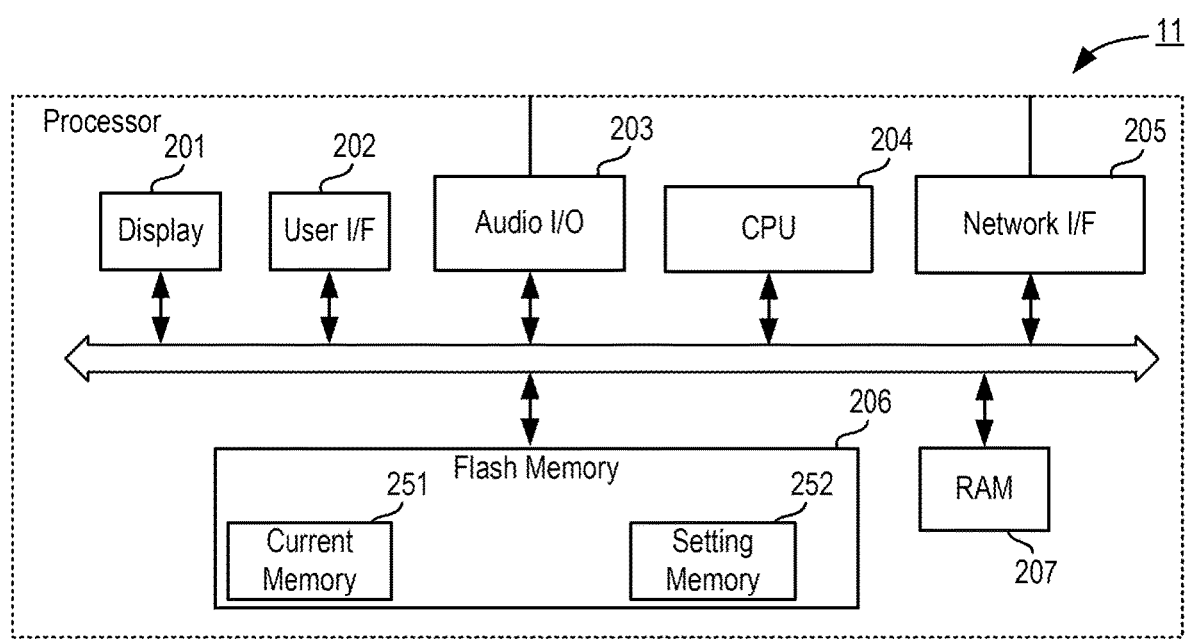
FIG. 2 is a block diagram showing a hardware configuration of a processor 11.

FIG. 2 is a block diagram showing a configuration of the processor 11. The processor 11 includes a display 201, a user I/F 202, an audio I/O (Input/Output) 203, a CPU 204, a network I/F 205, a flash memory 206, and a RAM 207.

The display 201 is mainly made of an LED or an LCD, and displays various types of information (a power ON/OFF state, for example). The user I/F 202 is a physical controller such as a switch or a button. The user I/F 202 takes a user operation such as power ON/OFF.

The CPU 204 functions as a controller (a first CPU) to perform system control. The CPU 204 also functions as a signal processor (a second CPU) to perform audio signal processing. The CPU 204 reads and executes a predetermined program stored in the flash memory 206 being a storage medium to the RAM 207 and performs operations of a controller and a signal processor.

The CPU 204 performs audio signal processing such as filter processing on an audio signal to be inputted from an acoustic device such as the microphone 15 through the audio I/O 203 or the network I/F 205. The CPU 204 outputs the audio signal on which the signal processing has been performed, to an acoustic device such as the speaker 14, through the audio I/O 203 or the network I/F 205.

A parameter that shows content of the audio signal processing is stored in a current memory 251 in the flash memory 206. The CPU 204 performs audio signal processing based on the parameter stored in the current memory 251.

Setting details (setting information) of the system control is stored in a setting memory 252 in the flash memory 206. The CPU 204 performs the system control based on the setting information stored in the setting memory 252. The system control includes patch setting (wire connection management) for an input port (a physical port) to receive an input of an audio signal and an input channel, for example.

It is to be noted that the program that the CPU 204 reads does not need to be stored in the flash memory 206 in the own apparatus. For example, the program may be stored in a storage medium of an external apparatus such as a server. In such a case, the CPU 204 may read out the program each time from the server to the RAM 207 and may execute the program.

Figure 3:
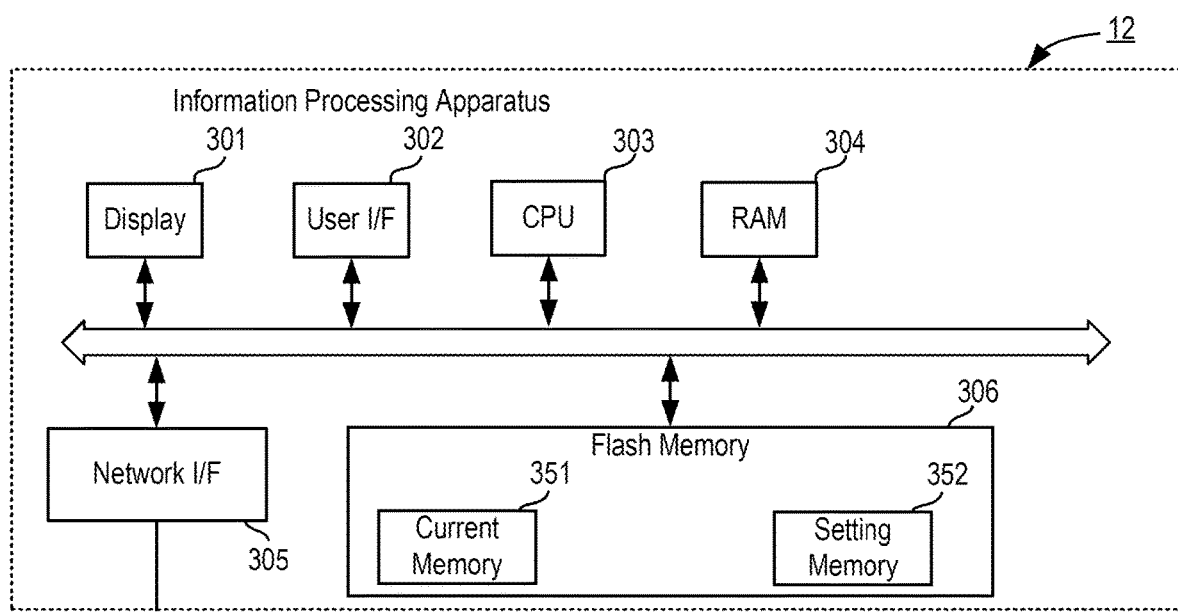
FIG. 3 is a block diagram showing a configuration of an information processing apparatus 12.

Next, FIG. 3 is a block diagram showing a configuration of the information processing apparatus 12. The information processing apparatuses 12 is an information processing apparatus such as a personal computer or a dedicated embedded system, for example.

The information processing apparatus 12 includes a display 301, a user I/F 302, a CPU 303, a RAM 304, a network I/F 305, and a flash memory 306.

The CPU 303 reads out a program stored in the flash memory 306 being a storage medium to the RAM 304 and implements a predetermined function. It is to be noted that the program that the CPU 303 reads out does not also need to be stored in the flash memory 306 in the own apparatus. For example, the program may be stored in a storage medium of an external apparatus such as a server. In such a case, the CPU 303 may read out the program each time from the server to the RAM 304 and may execute the program.

The flash memory 306 includes a current memory 351 and a setting memory 352. The current memory 351 is synchronized with the current memory 251 of the processor 11. In addition, the setting memory 352 is synchronized with the setting memory 252 of the processor 11.

For example, when a user operates the user I/F 202 of the processor 11 and changes the parameter, the processor 11 updates content of the current memory 251 and then sends updated content of the current memory 251 to the information processing apparatus 12. The CPU 303, through the network I/F 305, receives the updated content of the current memory 251, and synchronizes content of the current memory 351 with the updated content of the current memory 251. In addition, when the user operates the user I/F 302 of the information processing apparatus 12 and changes the parameter, the information processing apparatus 12 updates the content of the current memory 351 and sends updated content of the current memory 351 to the processor 11. The CPU 204, through the network I/F 205, receives the updated content of the current memory 351, and synchronizes the updated content of the current memory 251 with the content of the current memory 351.

It is to be noted that the processor 11 and the information processing apparatus 12, in a case of being not connected to each other, independently change the content of the current memory. Then, the processor 11 and the information processing apparatus 12, in a case of being connected to each other, update the content of one of the current memory 251 of the processor 11 or the current memory 351 of the information processing apparatus 12 with the content of the other. The user may select to use either the content of the current memory 251 of the processor 11 or the content of the current memory 351 of the information processing apparatus 12.

Figure 4:
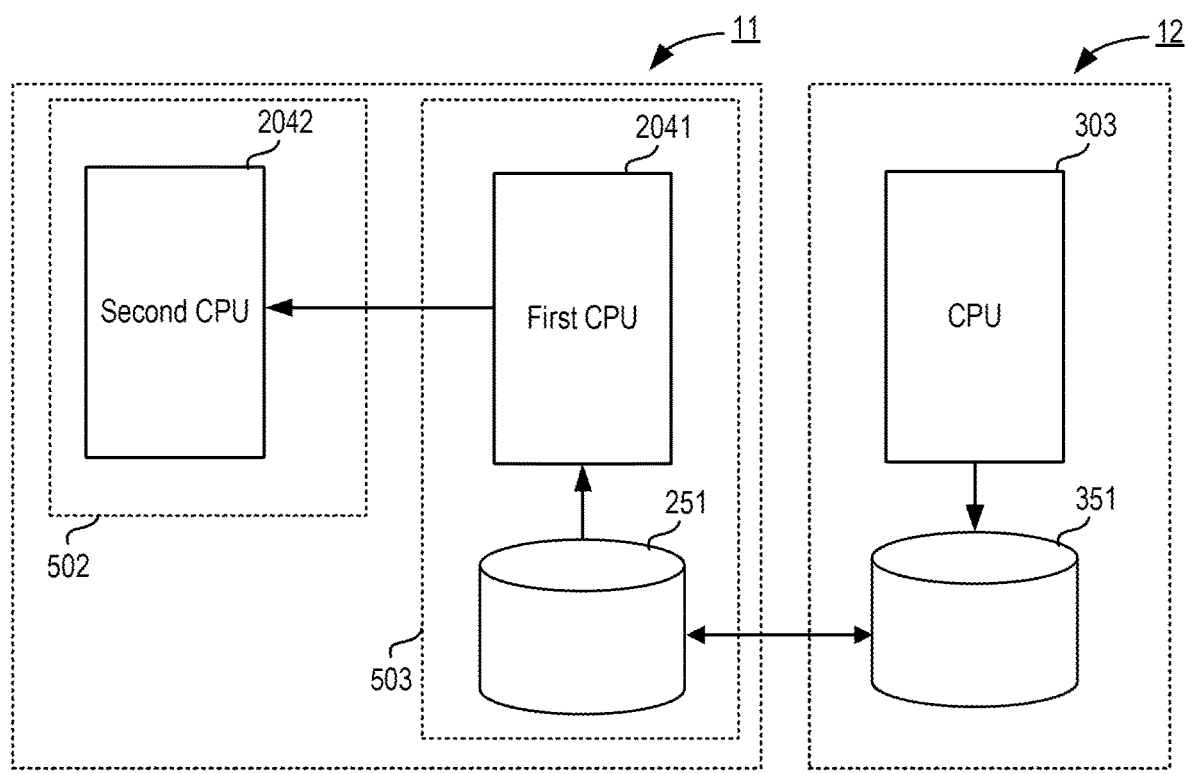
FIG. 4 is a functional block diagram of the processor 11 and the information processing apparatus 12.
Figure 5:
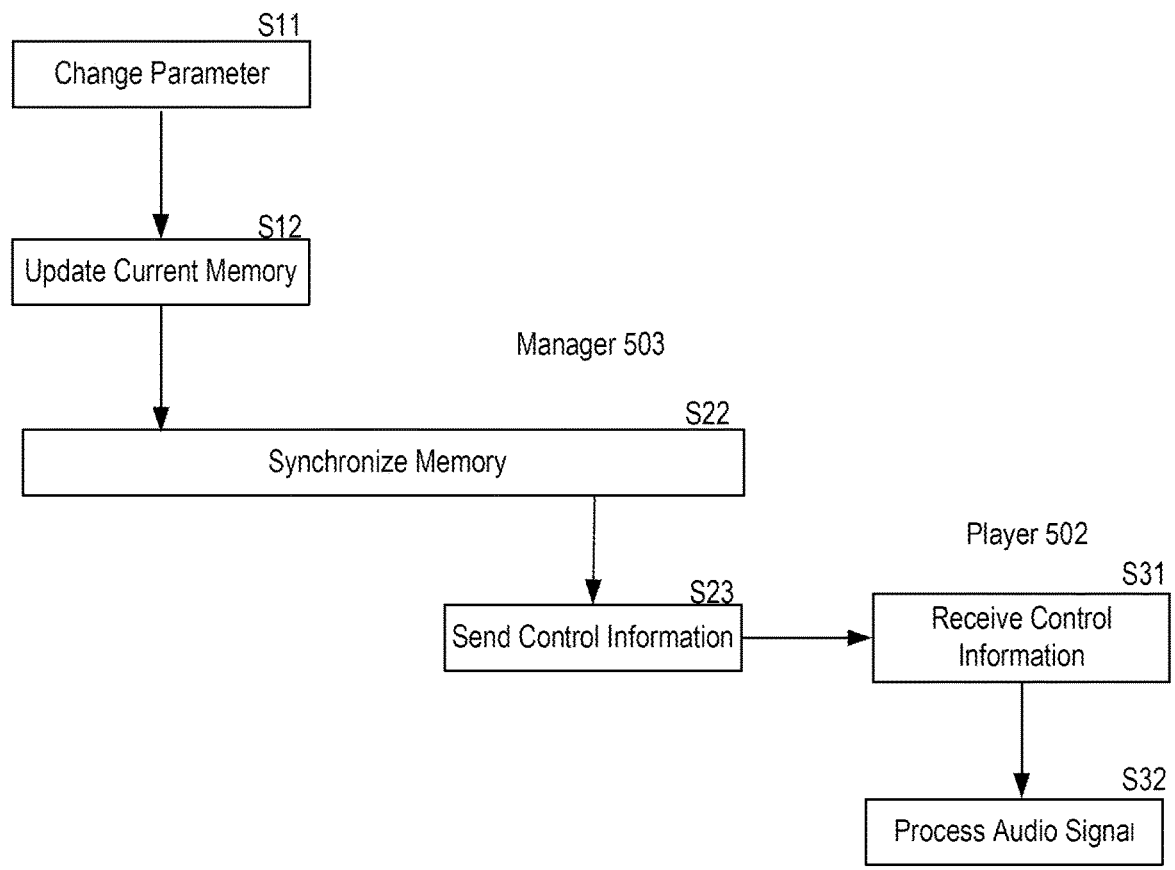
FIG. 5 is a flow chart showing an operation of the acoustic processing system.

Subsequently, FIG. 4 is a functional block diagram of the processor 11 and the information processing apparatus 12. FIG. 5 is a flow chart showing an operation of the acoustic processing system. As shown in FIG. 4, the processor 11 functionally configures a player 502 and a manager 503. The manager 503 configures a controller (a first CPU 2041) to perform system control. The player 502 configures a signal processor (a second CPU 2042) to perform audio signal processing. In this example, the information processing apparatus is an example of a first apparatus, the manager 503 is an example of a second apparatus, and the player 502 is an example of a third apparatus.

The player 502 and the manager 503 are configured as virtually different apparatuses within the same physical apparatus. The player 502 and the manager 503 communicate using a predetermined protocol (TCP/IP: Transmission Control Protocol/Internet Protocol, for example). It is to be noted that, in this example, the first CPU 2041 and the second CPU 2042 in one physical CPU 204 function as virtually different CPUs. However, the first CPU 2041 and the second CPU 2042 may be different cores in one physical CPU including a plurality of cores. In addition, the first CPU 2041 and the second CPU 2042 may be physically different CPUs.

The CPU 303 of the information processing apparatus 12 takes an operation of a parameter through the user I/F 302 being an operator (S11). The CPU 303 updates the current memory 351 being a first memory by a changed parameter (S12).

The manager 503 synchronizes the current memory 251 being a second memory with the current memory 351 being the first memory (S22). In addition, at this time, the manager 503 may synchronize the setting memory 252 and the setting memory 352. The manager 503 performs system control based on synchronized setting memory 252. In other words, the first memory may include both the current memory 351 and the setting memory 352, and the second memory may include both the current memory 251 and the setting memory 252.

Next, the first CPU 2041 sends control information to control audio signal processing to the player 502 based on the parameter stored in the current memory 251 (S23). The control information includes a filter coefficient in filter processing, for example. As described above, the manager 503 and the player 502 are configured as virtually different apparatuses, and the manager 503 sends the control information to the player 502 by using a protocol such as TCP/IP.

The second CPU 2042 of the player 502 receives the control information (S31), and performs audio signal processing based on the control information (S32). Specifically, the second CPU 2042 performs audio signal processing such as filter processing on an audio signal to be inputted from an acoustic device such as the microphone 15, and outputs the audio signal on which the signal processing has been performed, to an acoustic device such as the speaker 14.

Figure 6:
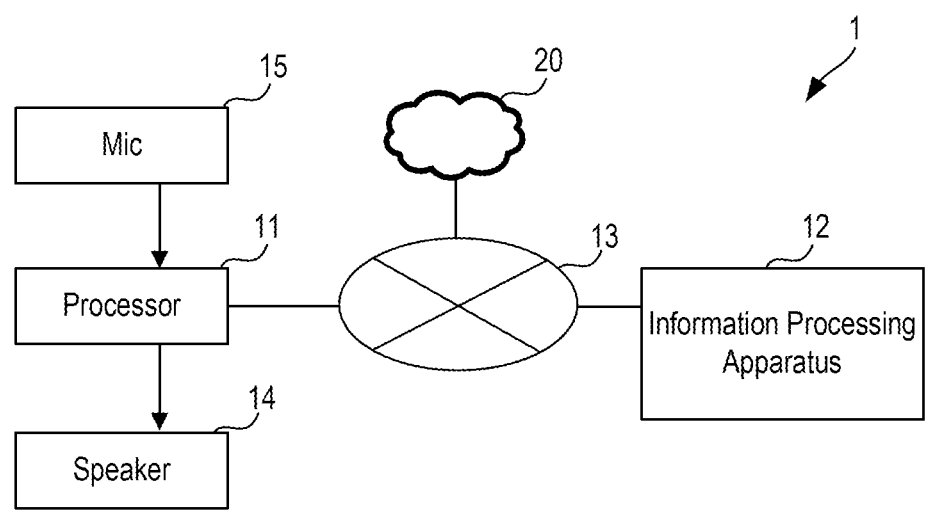
FIG. 6 is a block diagram of the acoustic processing system 1 further including a cloud server 20.
Figure 7:
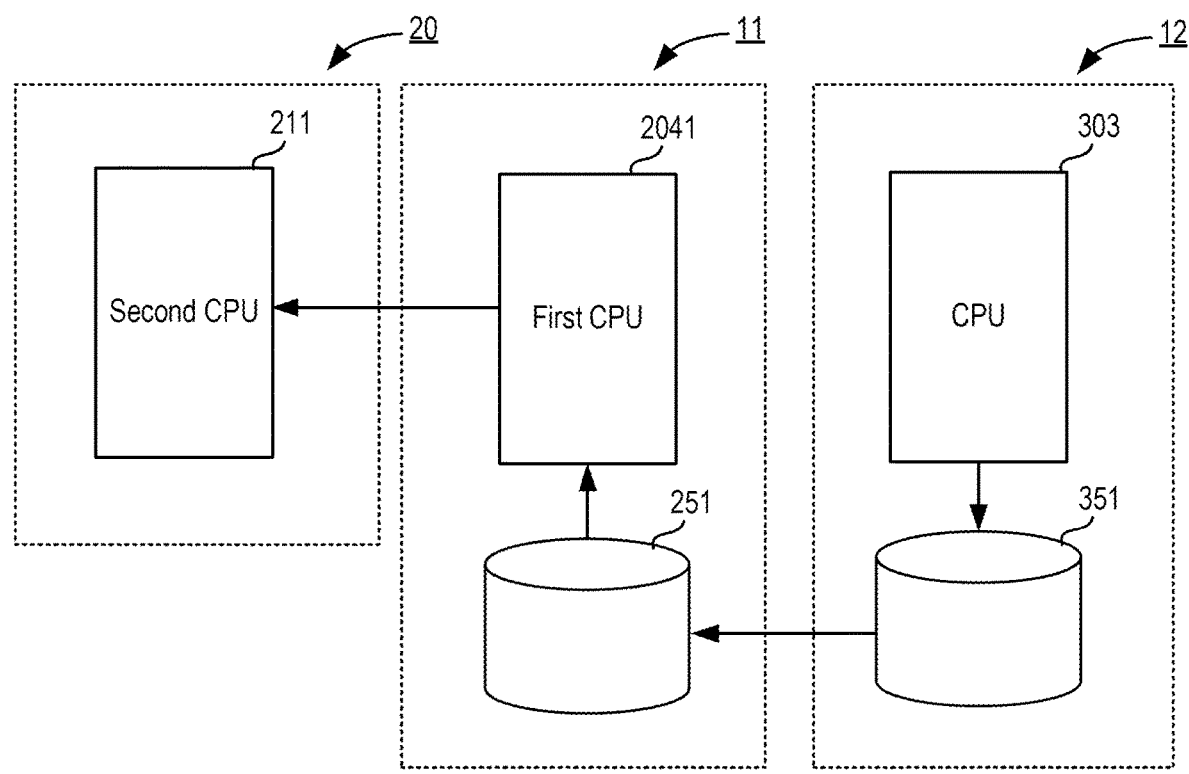
FIG. 7 is a functional block diagram of the processor 11, the cloud server 20, and the information processing apparatus 12.

As described above, according to the acoustic processing system 1 of the present embodiment, the processor 11 configures the manager 503 and the player 502 as different apparatuses, and the manager 503 sends control information to the player 502 by using a protocol such as TCP/IP. Therefore, the manager 503 is able to send the control information not only to the player 502 in the processor 11 but also to any audio signal processing apparatus capable of receiving information by a protocol such as TCP/IP, and control the audio signal processing. For example, FIG. 6 is a block diagram of the acoustic processing system 1 further including a cloud server 20. FIG. 7 is a functional block diagram of the processor 11, the cloud server 20, and the information processing apparatus 12.

The cloud server 20 is an example of an audio signal processing apparatus. In such a case, the first CPU 2041 of the manager 503 sends the control information to the cloud server 20 by using a protocol such as TCP/IP. The cloud server 20 configures a second CPU 211. The second CPU 211 receives the control information from the first CPU 2041, and performs audio signal processing based on the control information. At this time, the first CPU 2041 sends an audio signal to be inputted from the acoustic device such as the microphone 15 to the second CPU 211 by similarly using a protocol such as TCP/IP. The second CPU 211 receives the control information and the audio signal from the first CPU 2041, and performs audio signal processing on a received audio signal based on the control information. The second CPU 211 sends the audio signal on which the signal processing has been performed, to the first CPU 2041 by a protocol such as TCP/IP. The first CPU 2041 outputs the received audio signal to the acoustic device such as the speaker 14.

In this manner, the second apparatus that performs the system control and the third apparatus that performs the audio signal processing do not need to be configured as virtually different apparatuses within the same physical apparatus and may be as physically different apparatuses. In other words, each of the second apparatus and the third apparatus may be independent information processing apparatus.

Figure 8:
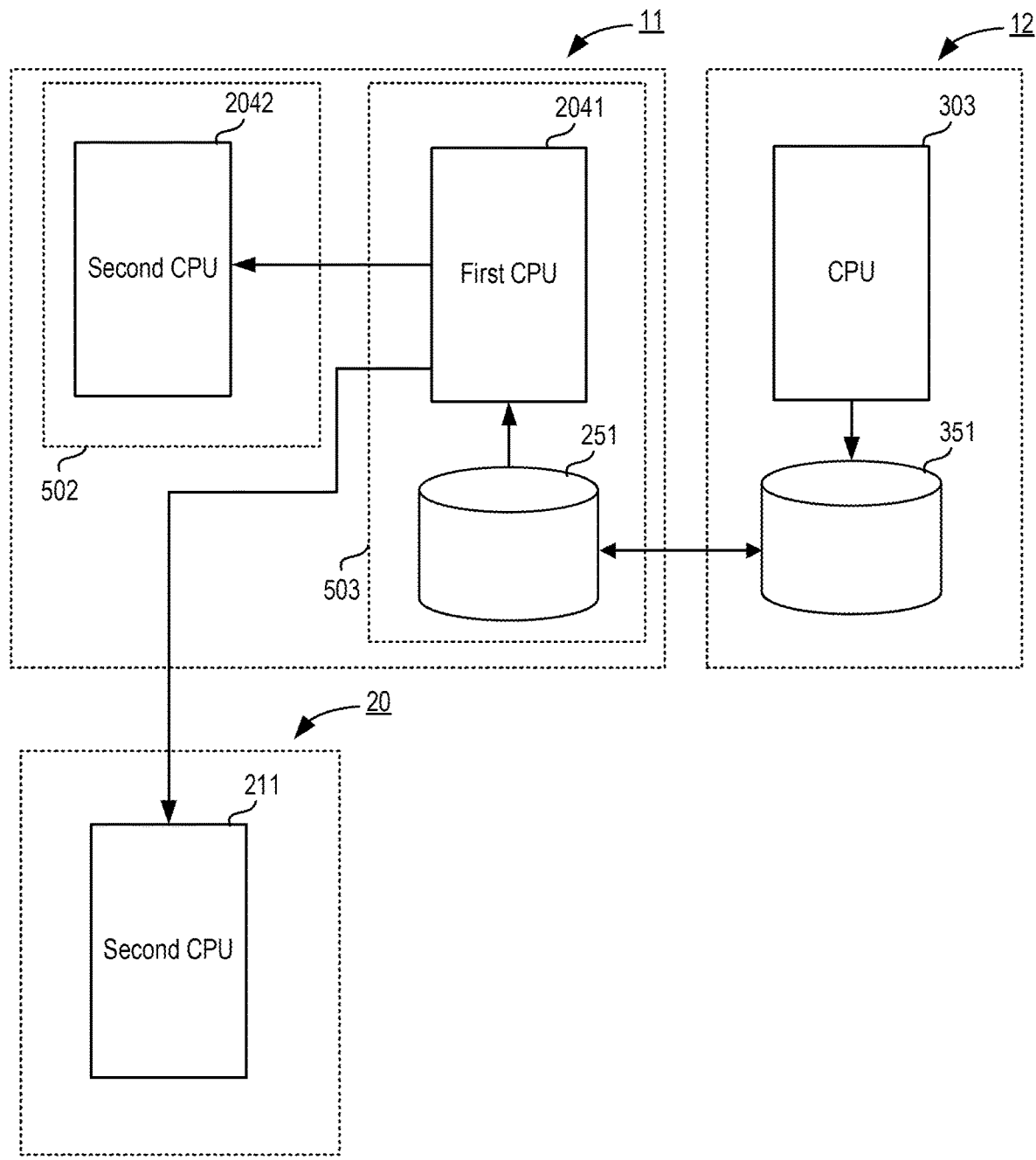
FIG. 8 is another functional block diagram of the processor 11, the cloud server 20, and the information processing apparatus 12.

The acoustic processing system 1 according to the present embodiment may be able to cause the player 502 of the own apparatus to execute audio signal processing or may be able to cause a different apparatus such as the cloud server 20 to execute audio signal processing. In addition, as shown in FIG. 8, the first CPU 2041 of the manager 503 is also able to cause both the second CPU 2042 of the player 502 of the own apparatus and the second CPU 211 of the cloud server 20 to execute audio signal processing. In such a case, the manager 503 may determine audio signal processing to be executed by the second CPU 2042 and audio signal processing to be executed by the second CPU 211 based on the processing capacity of each of the second CPU 2042 and the second CPU 211. Alternatively, the manager 503 may determine audio signal processing to be executed by the second CPU 2042 and audio signal processing to be executed by the second CPU 211 according to the acceptable range of latency in filter processing. In a case in which an audio signal is sent and received to the cloud server 20, the latency by communication is increased. The manager 503, for example, may cause the second CPU 211 to execute audio signal processing of which the acceptable range of latency is large.

As described above, the manager 503, since using a general-purpose protocol such as TCP/IP, is able to flexibly and easily distribute audio signal processing. In addition, the user only remotely changes the parameter of the processor 11 by using the information processing apparatus 12, and does not need to control the player 502 on the side of signal processing, and also does not need to manage which apparatus performs which signal processing.

Figure 9:
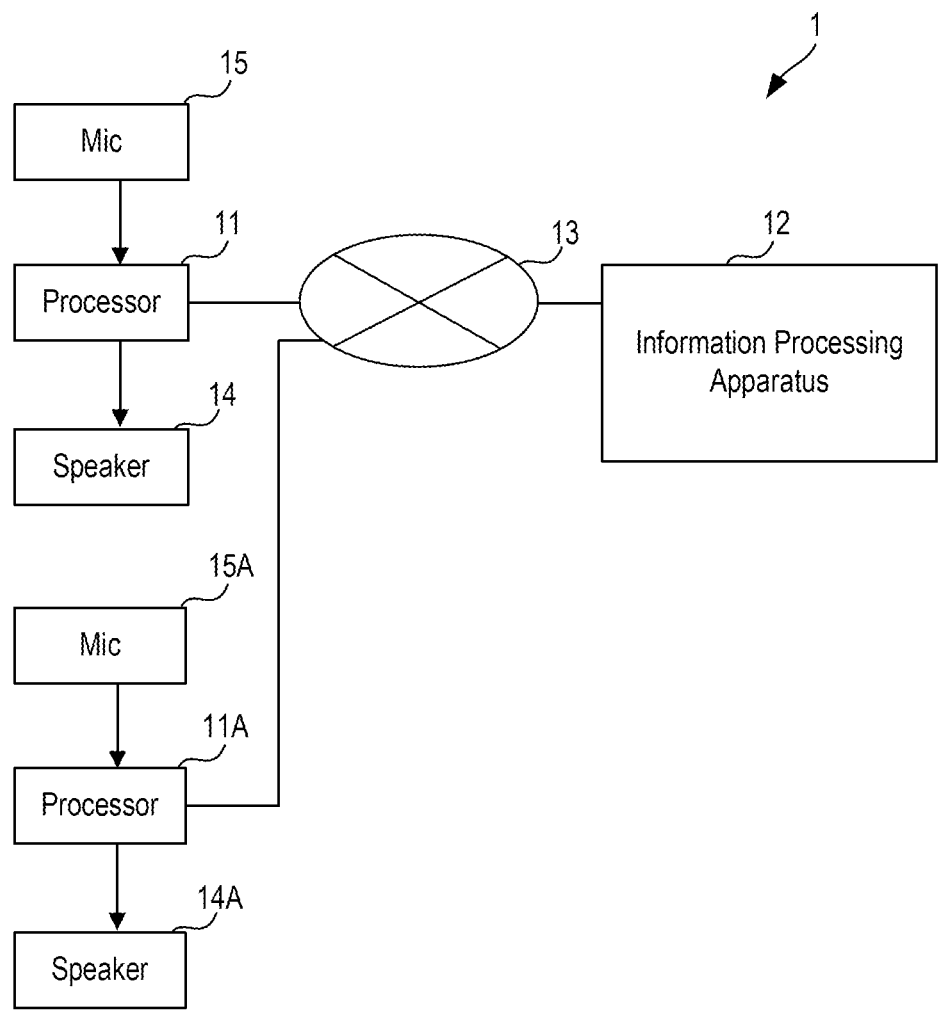
FIG. 9 is a block diagram of the acoustic processing system 1 further including a processor 11A.
Figure 10:
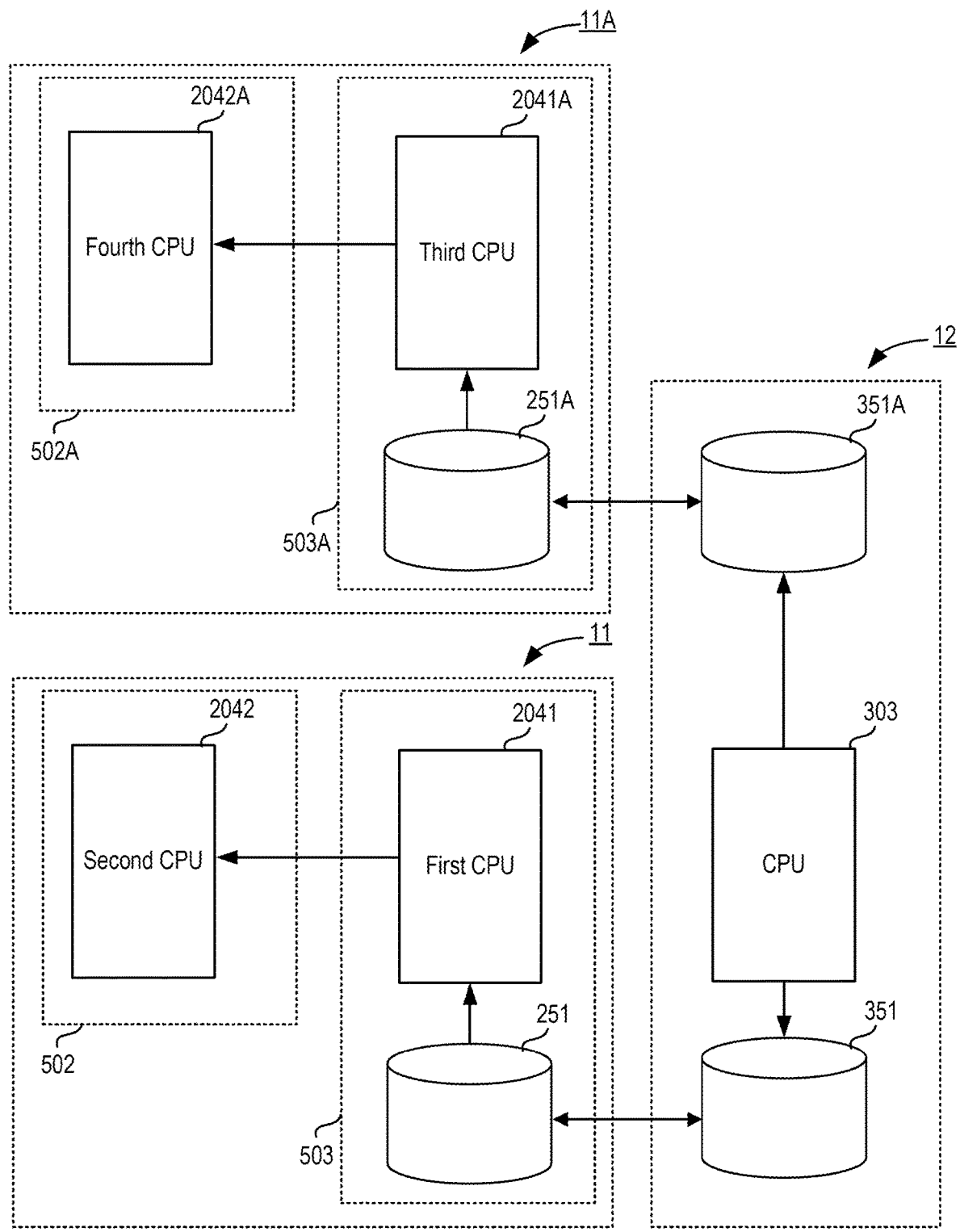
FIG. 10 is a functional block diagram of the processor 11, the processor 11A, and the information processing apparatus 12.

Furthermore, the information processing apparatus 12 is also able to change a parameter not only to one audio signal processing apparatus but also to a plurality of audio signal processing apparatuses. FIG. 9 is a block diagram of the acoustic processing system 1 further including a processor 11A, a speaker 14A, and a microphone 15A. FIG. 10 is a functional block diagram of the processor 11, the processor 11A, and the information processing apparatus 12. The hardware and the functional configuration of the processor 11A are the same as the hardware and the functional configuration of the processor 11.

In this example, the information processing apparatus 12 includes a current memory 351A that stores a parameter different from the parameter of the current memory 351. The current memory 351A is an example of a third memory. The current memory 351A is synchronized with a current memory 251A of the processor 11A. It is to be noted that the processor 11A and the information processing apparatus 12, in the case of being not connected to each other, independently change the content of the current memory. Then, the processor 11A and the information processing apparatus 12, in the case of being connected to each other, update the content of one of the current memory 251 of the processor 11A or the current memory 351 of the information processing apparatus 12 with the content of the other. In other words, the information processing apparatus 12 may be able to independently change the content of the current memory 351 in a case of being not connected to the processor 11A or may be able to independently change the content of the current memory 351 in a case of being not connected to the processor 11.

As shown in FIG. 10, the processor 11A, as with the processor 11, functionally configures a player 502A and a manager 503A. The manager 503A configures a controller (a third CPU 2041A) to perform system control. The player 502A configures a signal processor (a fourth CPU 2042A) to perform audio signal processing. In this example, the manager 503A includes a current memory 251A being a fourth memory, and is an example of a fourth apparatus that performs system control, and the player 502A is an example of a fifth apparatus that performs audio signal processing.

In this example as well, the player 502A and the manager 503A are configured as virtually different apparatuses within the same physical apparatus. The player 502A and the manager 503A communicate by a protocol such as TCP/IP. Moreover, the fourth apparatus that performs the system control and the fifth apparatus that performs the audio signal processing do not need to be configured as virtually different apparatuses within the same physical apparatus and may be as physically different apparatuses. In other words, each of the fourth apparatus and the fifth apparatus may also be independent information processing apparatus.

The third CPU 2041A sends control information to control audio signal processing to the player 502A based on the parameter stored in the current memory 251A. The fourth CPU 2042A of the player 502A receives the control information, and performs audio signal processing based on the control information.

In this manner, the information processing apparatus 12 is also able to remotely control content (a current memory) of signal processing of a plurality of audio signal processing apparatuses.

Figure 11:
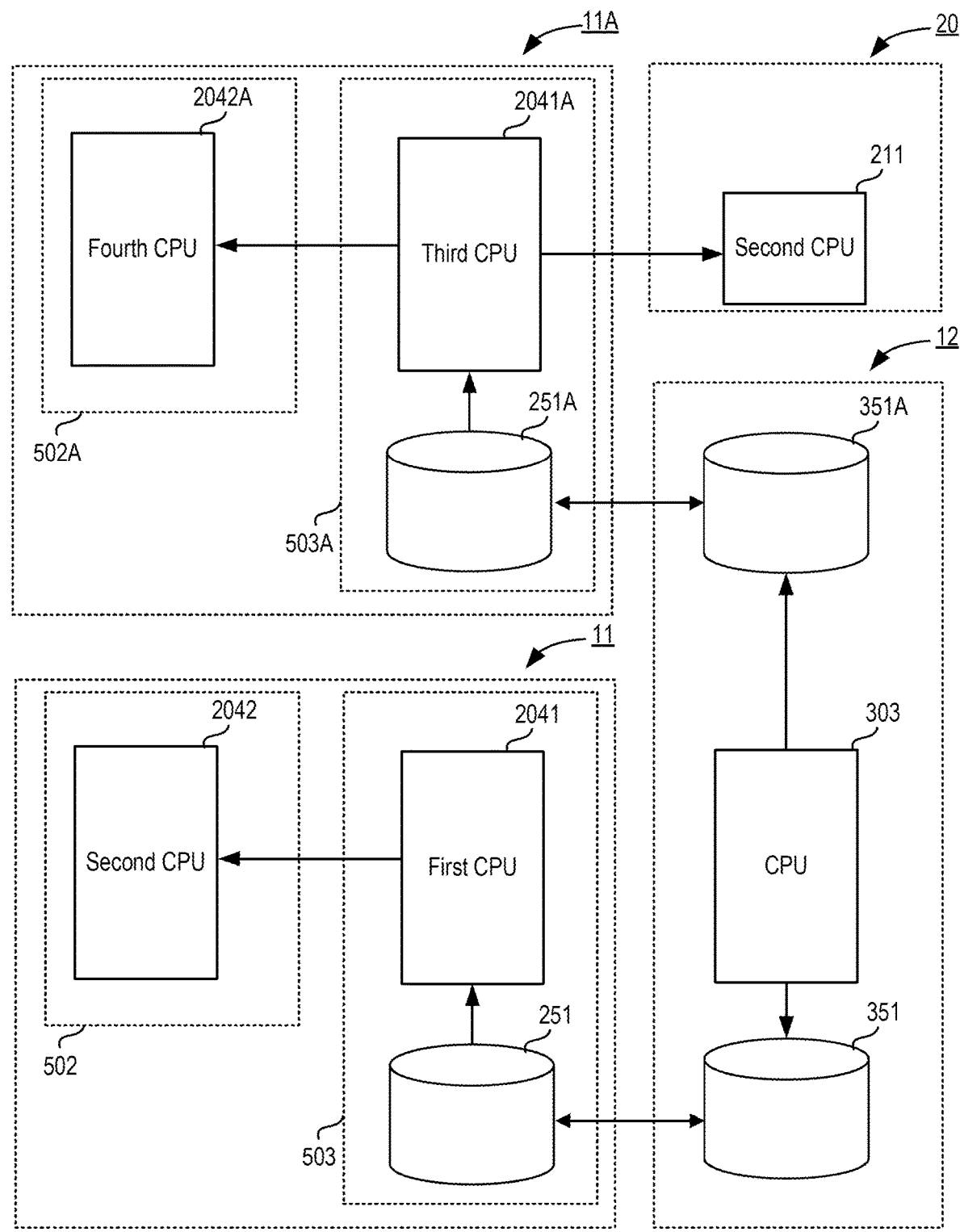
FIG. 11 is a functional block diagram of the processor 11, the processor 11A, the cloud server 20, and the information processing apparatus 12.

In addition, the manager 503A of the processor 11A, as with the manager 503, is also able to cause a different apparatus such as the cloud server 20 to execute audio signal processing. In addition, as shown in FIG. 11, the third CPU 2041A of the manager 503A is also able to cause both the fourth CPU 2042A of the player 502A of the own apparatus and the second CPU 211 of the cloud server 20 to execute audio signal processing. In such a case, the manager 503A may determine audio signal processing to be executed by the fourth CPU 2042A and audio signal processing to be executed by the second CPU 211 based on the processing capacity of each of the fourth CPU 2042A and the second CPU 211. Alternatively, the manager 503A may determine audio signal processing to be executed by the fourth CPU 2042A and audio signal processing to be executed by the second CPU 211 according to the acceptable range of latency in filter processing.

The description of the foregoing embodiments is illustrative in all points and should not be construed to limit the present disclosure. The scope of the present disclosure is defined not by the foregoing embodiments but by the following claims for patent. Further, the scope of the present disclosure is intended to include all modifications within the scopes of the claims for patent and within the meanings and scopes of equivalents.

The audio signal processing apparatus includes an amplifier, a mixer, or an audio amplifier, for example, in addition to a processor.

Figure 12:
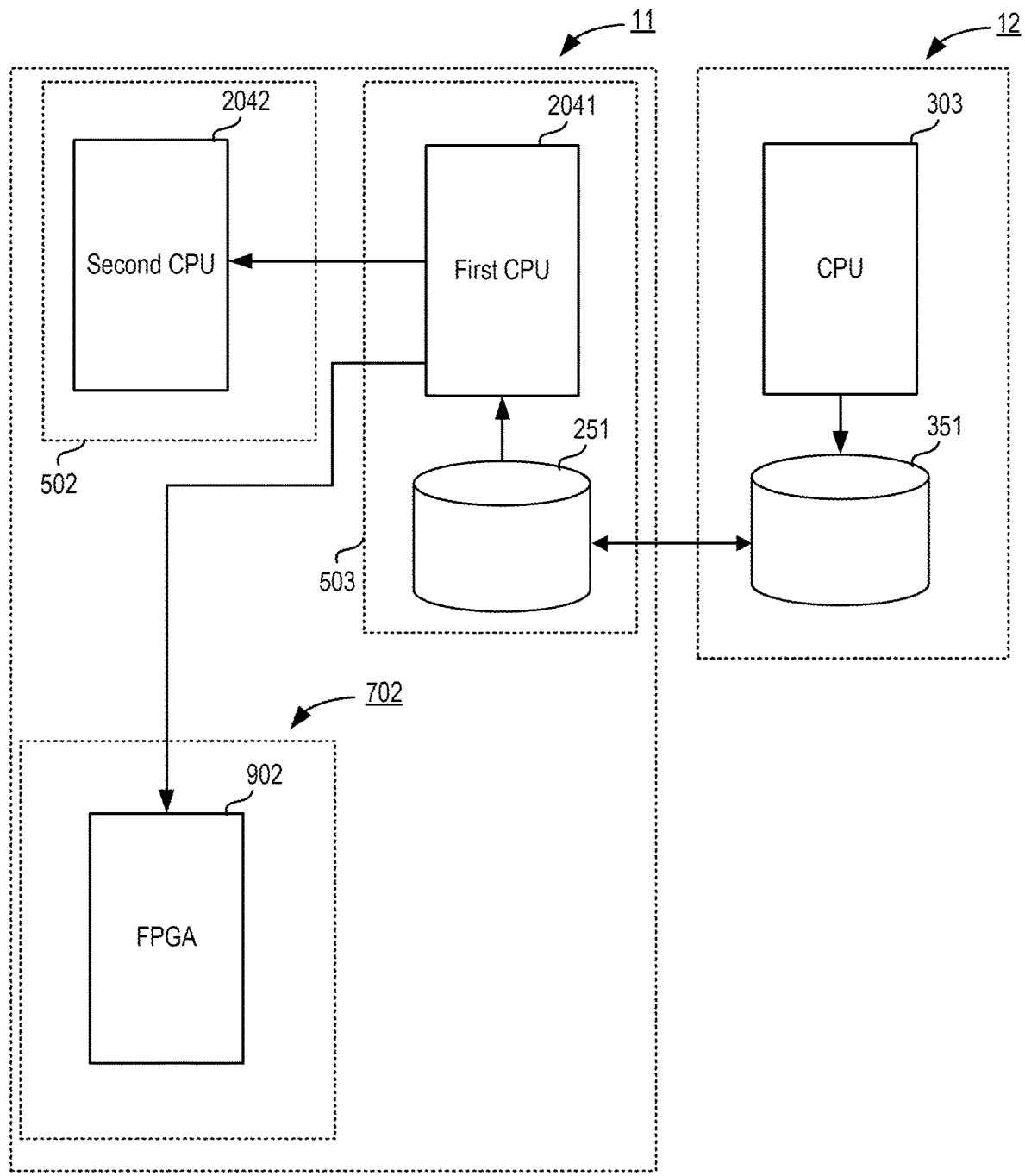
FIG. 12 is a functional block diagram of the processor 11 and the information processing apparatus 12.

In the above embodiment, the CPU configures the function to perform audio signal processing. However, as shown in FIG. 12, for example, the processor 11 may perform a signal processing function by hardware (a DSP or an FPGA, for example). The processor 11 shown in FIG. 12 further includes a signal processing apparatus 702 including an FPGA 902. The manager 503 sends the control information to control audio signal processing to the player 502 and the signal processing apparatus 702 based on the parameter stored in the current memory 251. The FPGA 902 of the signal processing apparatus 702 receives the control information, and performs audio signal processing based on the control information.

The manager 503 may determine audio signal processing to be executed by the second CPU 2042 and audio signal processing to be executed by the FPGA 902 based on the processing capacity of each of the second CPU 2042 and the FPGA 902. Alternatively, the manager 503 may determine audio signal processing to be executed by the second CPU 2042 and audio signal processing to be executed by the FPGA 902 according to the acceptable range of latency in filter processing.

Figure 13:
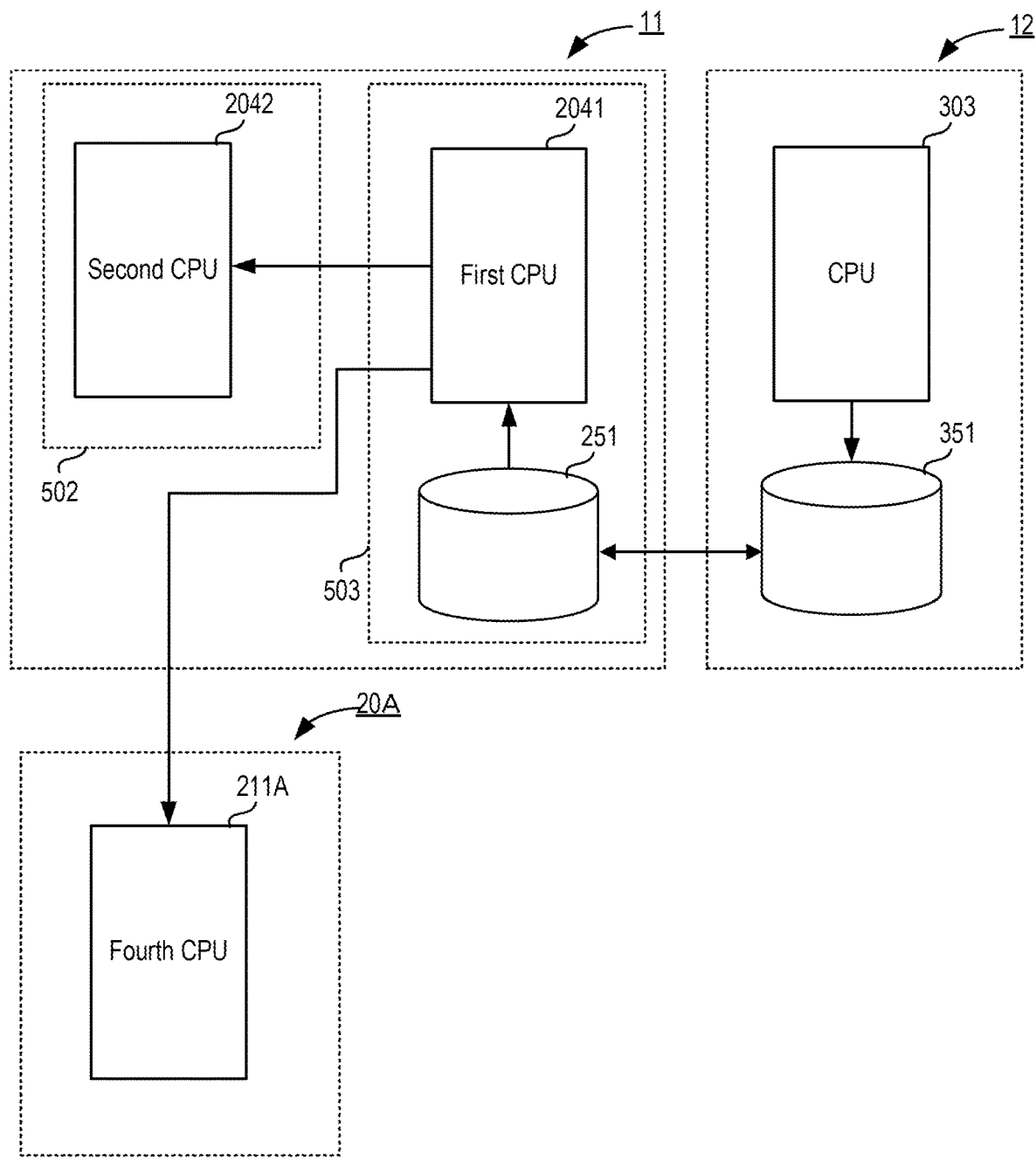
FIG. 13 is a functional block diagram showing an example in which control information is sent to an audio amplifier 20A.

The manager 503, in a case of sending the control information to the plurality of audio signal processing apparatuses, may send to one apparatus by a first protocol and may send to another apparatus by a second protocol. FIG. 13 is a functional block diagram showing an example in which the control information is sent to an audio amplifier 20A. The audio amplifier 20A includes a fourth CPU 211A that performs audio signal processing. The manager 503 may send the control information to the player 502 by TCP/IP, and may send the control information to the fourth CPU 211A of the audio amplifier 20A by a different protocol (TMDS: Transition Minimized Differential Signaling, for example).

Figure 14:
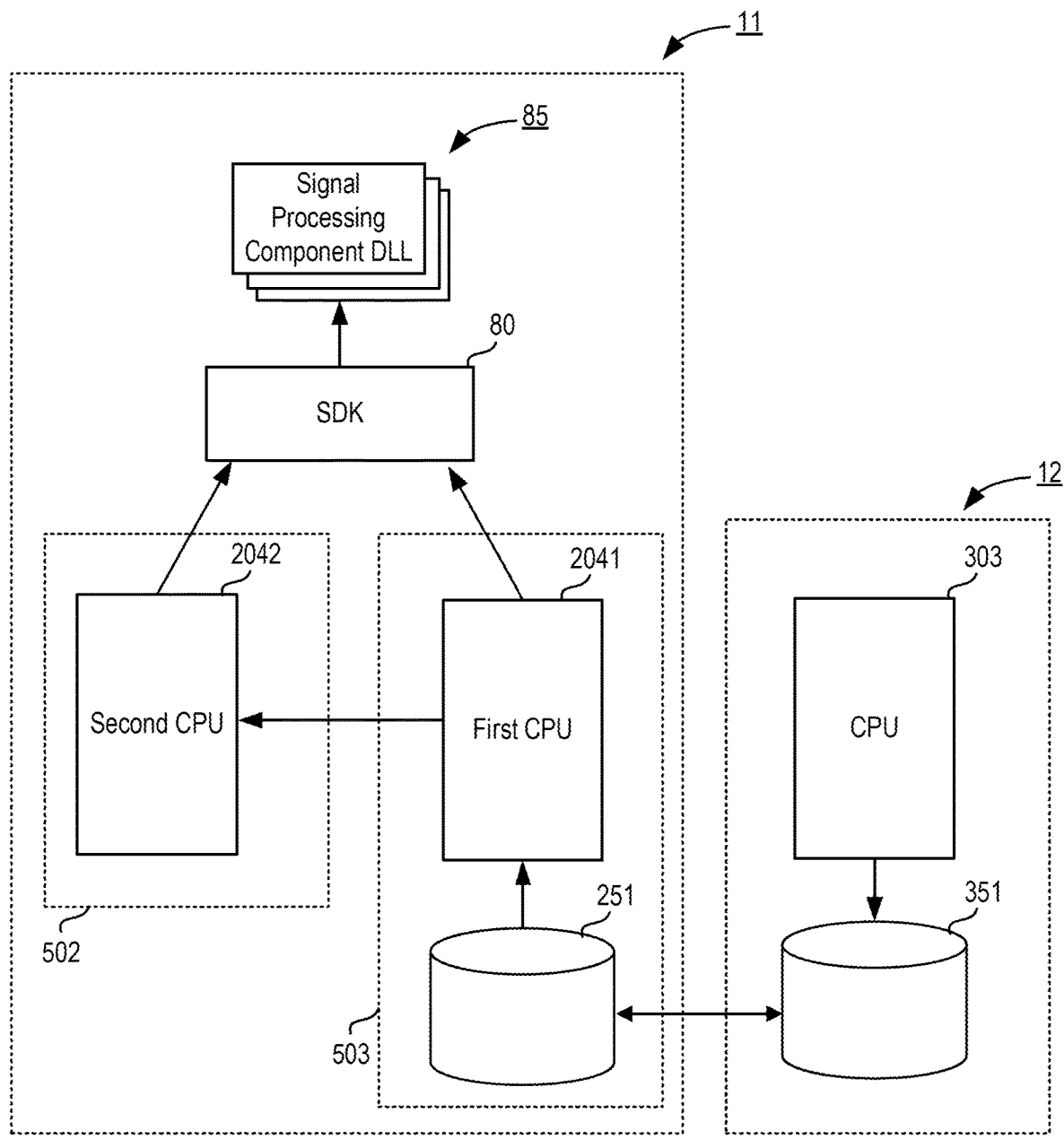
FIG. 14 is a functional block diagram showing an example in which a signal processing component is stored as a DLL.

FIG. 14 is a functional block diagram showing an example in which a signal processing component is stored as a DLL (Dynamic Link Library). The signal processing component collects specific content of the signal processing as information, and includes content of a parameter, a filter coefficient, and the like. The processor 11 functionally includes an SDK (Software Development Kit) 80. The SDK 80 is an example of an application program to store a signal processing component as a DLL. The SDK 80 generates a signal processing component including a parameter managed by the first CPU and a filter coefficient managed by the second CPU as a DLL 85. The DLL 85 is stored in the flash memory 206, for example.

As a result, the processor 11 is able to store the content of the signal processing that the user has set as a DLL. Any audio signal apparatus capable of developing a DLL is able to perform audio signal processing by executing the DLL.

What is claimed is:

1. An acoustic processing system for audio signal processing comprising:
   a first apparatus including:
      a first memory that stores a first parameter for the audio signal processing, and
      a user interface that receives an operation for changing the first parameter;
   a second apparatus including:
      a second memory that stores a second parameter synchronized with the first parameter,
      a first CPU that performs system control,
      a second CPU that performs the audio signal processing,
   wherein the first CPU sends, to the second CPU, control information for controlling the audio signal processing based on the second parameter using a TCP/IP protocol, and
   wherein the second CPU receives the control information using the TCP/IP protocol, and performs the audio signal processing based on the control information,
   wherein the first CPU and the second CPU are one of:
      virtually different CPUs of a single physical CPU,
      different cores of the single physical CPU that includes a plurality of cores, or
      physically different CPUs within the second apparatus.

2. The acoustic processing system according to claim 1, wherein:
   the first apparatus includes a third memory that stores a third parameter different from the first parameter; and
   the acoustic processing system further includes another apparatus including a fourth memory synchronized with the third memory and a third CPU that performs the system control.

3. The acoustic processing system according to claim 1, further comprising:
   another apparatus including another CPU that performs the audio signal processing,
   wherein the first CPU sends the control information to the another CPU, and
   wherein the another CPU receives the control information, and performs the audio signal processing based on the received control information.

4. The acoustic processing system according to claim 3, wherein the first CPU sends the control information to the another CPU using a TMDS protocol.

5. The acoustic processing system according to claim 1, wherein the first memory and the second memory further store setting information for performing the system control.

6. An acoustic processing method of audio signal processing using a first apparatus including a first memory and a user interface, and a second apparatus including a second memory, a first CPU, and a second CPU, the acoustic processing method comprising:
storing, in the first memory, a first parameter for audio signal processing;
receiving, via the user interface, an operation for changing the first parameter;
storing, in the second memory, a second parameter synchronized with the first parameter;
performing system control with the first CPU;
performing the audio signal processing with the second CPU;
the first CPU sending to the second CPU, control information for controlling the audio signal processing based on the second parameter using a TCP/IP protocol;
the second CPU receiving the control information using the TCP/IP protocol; and
the second CPU performing the audio signal processing based on the received control information,
wherein the first CPU and the second CPU are one of:
virtually different CPUs of a single physical CPU,
different cores of the single physical CPU that includes a plurality of cores, or
physically different CPUs within the second apparatus.

7. The acoustic processing method according to claim 6, wherein:
the first apparatus further includes a third memory,
the acoustic processing method further uses another apparatus including a third CPU and a fourth memory synchronized with the third memory, and
the method further comprises:
storing, in the third memory, a third parameter different from the first parameter; and
the third CPU performing system control.

8. The acoustic processing method according to claim 6, wherein:
the acoustic processing method further uses another apparatus including another CPU, and
the method further comprises:
the fourth CPU performing the audio signal processing;
the first CPU sending the control information to the another CPU;
the another CPU receiving the sent control information; and
the another CPU performing the audio signal processing based on the received control information.

9. The acoustic processing method according to claim 8, wherein the first CPU sends the control information to the another CPU using a TMDS protocol.

10. The acoustic processing method according to claim 6, wherein the first memory and the second memory further store setting information for performing the system control.

11. An audio signal processing apparatus for audio signal processing and communicable with an information processing apparatus including a first memory storing a first parameter for audio processing, and a user interface that receives an operation for changing the first parameter, the audio signal processing apparatus comprising:
a second memory that stores a second parameter synchronized with the first parameter; and
a first CPU that performs system control;
a second CPU that performs the audio signal processing,
wherein the first CPU sends, to the second CPU, control information for controlling the audio signal processing based on the second parameter using a TCP/IP protocol, and
wherein the second CPU receives the control information using the TCP/IP protocol, and performs the audio signal processing based on the control information,
wherein the first CPU and the second CPU are one of:
virtually different CPUs of a single physical CPU,
different cores of the single physical CPU that includes a plurality of cores, or
physically different CPUs within the second apparatus.

* * * * *